United States Patent Office 2,781,486
Patented Feb. 12, 1957

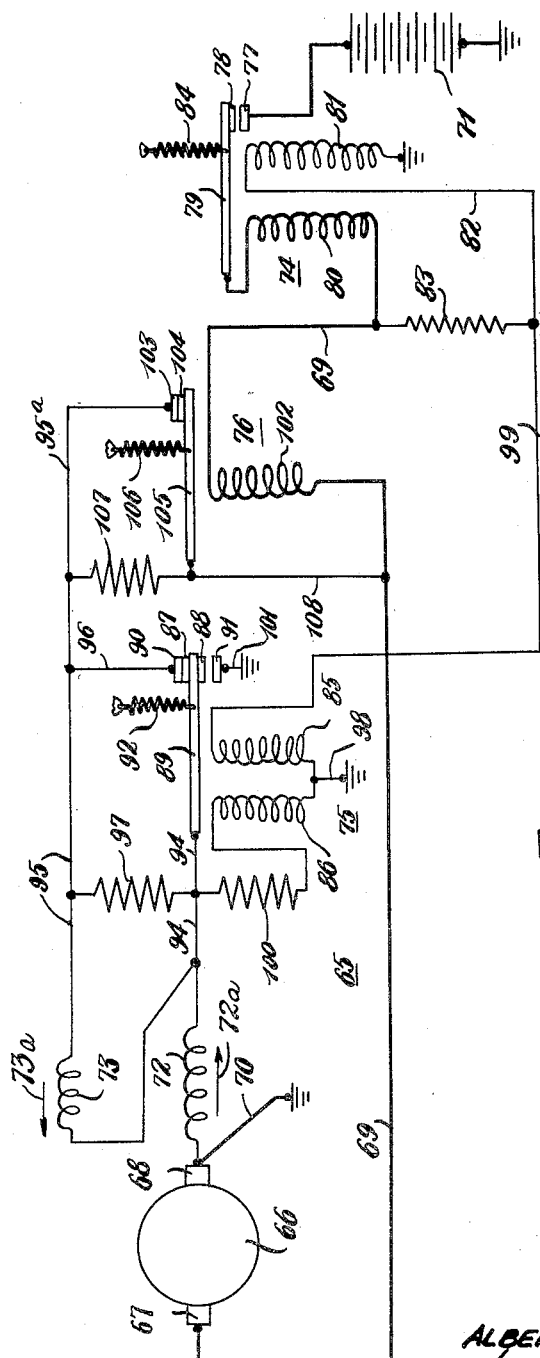

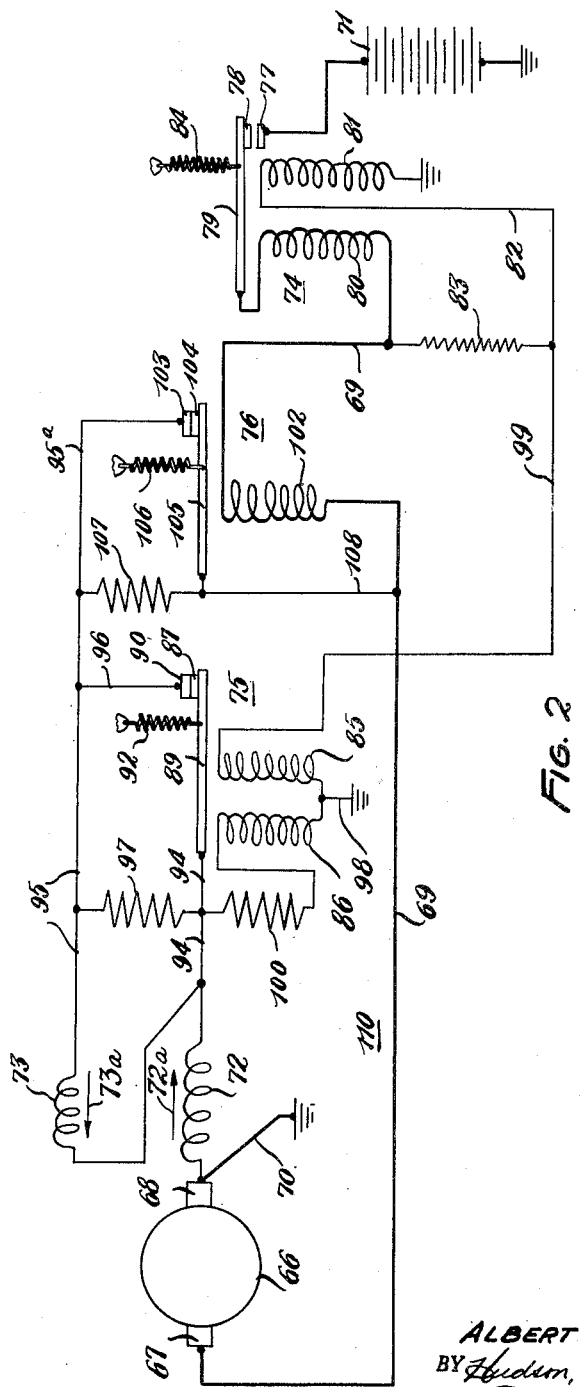

2,781,486

ELECTRICAL GENERATING SYSTEMS

Albert D. Gilchrist, Lyndhurst, Ohio, assignor to The Leece-Neville Company, Cleveland, Ohio, a corporation of Ohio Original application August 14, 1953, Serial No. 374,190, now Patent No. 2,738,457, dated March 13, 1956. Divided and this application November 4, 1955, Serial No. 544,894

6 Claims. (Cl. 322—28)

This invention relates to electrical generating systems and, more particularly, to novel regulating means effective to automatically maintain the terminal voltage of the generator substantially constant and to automatically control or limit the load current being delivered to a desired predetermined value. This novel regulating means is especially applicable to vehicle electrical systems in which the generator is driven at variable speeds and, accordingly, is hereinafter described as embodied in such a vehicle electrical system, but without any intension of limiting the invention solely to that specific use.

This application is a division of application Serial No. 374,190, filed August 14, 1953, now Patent No. 2,738,457.

An object of the invention is to provide novel regulating means for an electric generator in which the field of the generator includes a magnetically opposed or bucking winding, and in which current flow control means of the regulating means is responsive to an operating condition of the generator and controls the field current such that the bucking winding is energized in accordance with the voltage drop across such current flow control means.

Another object is to provide generating system control means in which the regulating means comprises a voltage regulator having vibratory contacts and a resistance in the field circuit in shunt relation to such contacts, and preferably, also comprises a current regulator or limiter having vibratory contacts and a resistance in the field circuit in shunt relation to the current regulator contacts, and in which the bucking field winding is adapted to be energized in accordance with the operating condition and requirements of the generator by being connected across the voltage regulator contacts.

A further object is to provide generating system control means of the character mentioned above in which the voltage regulator has multiple pairs of vibratory contacts, and in which the bucking field winding is energized in accordance with the voltage drop across one pair of the voltage regulator contacts.

The invention can be further briefly summarized as consisting in certain novel combinations and arrangements of parts hereinafter described and particularly set out in the claims hereof.

In the accompanying sheet of drawings, forming a part of this specification:

Fig. 1 is a wiring diagram illustrating an electrical generating system having the novel regulating means embodied therein and in which the current control means of the voltage regulator comprises a plurality of pairs of switch contacts; and Fig. 2 is a wiring diagram similar to Fig. 1, but in which the voltage regulator has only one pair of switch contacts.

Proceeding now with a more detailed description of the improved electrical system embodying the novel control means, reference will first be made to the form of the invention represented by the generating system 65 of Fig. 1. The system 65 is provided with a direct current generator 66 having brushes 67 and 68 with which a pair of load conductors 69 and 70 are connected, respectively. The load conductor 70 is a ground connection, but the load conductor 69 is connected with an external load, such as the storage battery 71. The generator 66 is provided with a main field winding 72 and an auxiliary field winding 73 which is in a bucking or magnetically opposed relation to the main field winding, as is represented by the directional arrows 72$^a$ and 73$^a$. The generating system 65 also comprises a load relay 74, a vibratory relay-type voltage regulator 75 and a vibratory load limiter or current regulator 76.

The load relay 74 comprises series contacts 77 and 78, of which the contact 78 is a movable contact carried by an armature 79. The load relay 72 also comprises a series magnet coil 80 and an operating coil or voltage magnet coil 81. The coil 81 has one end thereof connected with ground and its other end connected with the load conductor 69 through the circuit connection 82 and the ballast resistance 83. The movable contact 78 is normally urged toward an open position by the action of the tension spring 84 on the armature 79.

The voltage regulator 75 comprises primary and secondary energizing coils 85 and 86 and pairs of cooperating switch contacts 87, 90 and 88, 91 of which the movable contacts 87 and 88 are carried by a vibratory armature 89 and cooperate, respectively, with the upper and lower stationary contacts 90 and 91. The movable contact 87 is normally urged toward a position of engagement with the upper stationary contact 91 by the action of a tension spring 92 on the armature 89. The voltage regulator 75 also includes a so-called point resistance 97 which is connected in shunt relation to the upper pair of voltage regulator contacts 87 and 90, such that when these contacts are closed, this point resistance will be short-circuited thereby.

The main field winding 72 of the generator 66 is a shunt winding having one end thereof connected with the brush 68 and its other end connected with the movable contacts 87 and 88 of the voltage regulator 75 through the armature 89 and the conductor 94. The bucking field winding 73 has one end thereof connected with the movable contacts 87 and 88 through the conductor 94 and the armature 89 and has its other end connected with the stationary contact 90 through the conductors 95 and 96. The bucking field winding 73 is thus connected in shunt relation to the point resistance 97, such that the bucking winding will be energized in accordance with the voltage drop across this point resistance.

The magnet coils 85 and 86 of the voltage regulator 75 are the same primary and secondary regulator windings which have been used heretofore in voltage regulators of this type. The coil 85 is a voltage coil having one end thereof connected with the generator brush 68 through the ground connection 70 and the common ground connection 98 and having its other end connected with the load conductor 69 through the circuit connection 99 and the resistance 83. The secondary coil 86 has one end thereof connected with the movable contact 87 of the voltage regulator 75 through the armature 89, the conductor 94 and the ballast resistance 100 and has its other end connected with the generator brush 68 through the ground conductors 98 and 70. The lower stationary contact 91 of the voltage regulator 75 is connected with the brush 68 through a ground connection 101 and through the ground connection 70.

The current regulator 76 comprises a series magnet coil 102 located in the load conductor 69, and a pair of stationary and movable switch contacts 103 and 104 of which the movable contact 104 is carried by a vibratory armature 105. A tension spring 106 acting on the armature normally urges the movable contact 104 toward engagement with the stationary contact 103. The current regulator 76 also comprises a point resistance 107 which is in shunt relation to the current regulator contacts 103 and 104 by having one end thereof connected with the stationary contact 103 by the conductor 95a. The movable contact 104 of the current regulator is connected with the load conductor 69 through the armature 105 and the circuit connection 108.

When the generator 66 of the electrical system 65 is operating at low speed or under relatively heavy load, the tendency of the voltage regulator 75 will be to cause closing of the contacts 87 and 90 to thereby short-circuit the field regulating resistance 97 out of the energizing circuit of the main field winding 72. Whenever the operating condition of the generator 66 is such that the voltage regulator contacts 87 and 90 are opened, the point resistance 97 will be inserted into the field circuit of the main field winding 72 in series relation thereto. Similarly, whenever the current regulator contacts 103 and 104 are opened, the point resistance 107 will be inserted into the field energizing circuit for the main field winding 72 in series relation to the latter.

From the above-described circuit connections for the bucking field winding 73, it will be seen that this winding is energized by the field circuit in accordance with the voltage drop across the point resistance 97 of the voltage regulator 75. When the generator 66 is operating under the above-mentioned low speed or high load condition and the point resistance 97 is short-circuited by the closing of the contacts 87 and 90, the bucking action of the winding 73 will be relatively weak because of the substantially negligible voltage drop across the point resistance 97 at this time and the bucking winding will then have substantially no effect on the output of the generator. However, when the generator 66 is operating at a relatively high speed or under a low load condition, the tendency of the voltage regulator 75 will be to cause opening of the contacts 87 and 90, whereupon the resulting strong excitation of the bucking field winding 73 will be very effective in controlling the terminal voltage of the generator.

When the operating condition of the generator 66 is such that the movable contact 88 of the voltage regulator 75 engages the lower stationary contact 91, the main field winding 72 will be substantially short-circuited and the field excitation produced by this winding will be relatively suddenly destroyed or collapsed. The field regulating action of the voltage regulator 75, with respect to its lower pair of contacts 88 and 91, is thus similar to the regulator action heretofore accomplished in double-contact voltage regulators of this type, but because of the presence of the bucking field winding 73 and the effective control function produced thereby and the lower voltage needed across the regulator contacts, there will be less tendency for the occurrence of an ionized condition of the air in the air gaps between the switch contacts of the voltage regulator and, hence, less likelihood of the occurrence of a stuck or welded condition of the voltage regulator contacts such as has frequently occurred heretofore in devices of this kind.

Fig. 2 of the drawings shows an electrical generating system 110 which is the same as the system 65 of Fig. 1 and functions in the same manner, with the exception that in the system of Fig. 2, the lower contact of the voltage regulator 75 and the circuit connection for such lower contact have been omitted. The various parts of the system 110 which correspond with those of Fig. 1 are designated by the same reference characters.

From the accompanying drawings and the foregoing detailed description, it will now be readily understood that this invention provides improved electrical generating systems in which a bucking field winding used in association with the current flow control means of a regulating device, and particularly a voltage regulator, is highly effective in accomplishing a regulating action by which the terminal voltage of the generator can be maintained substantially constant. Likewise, it will now be understood that the bucking field winding is energized in accordance with the voltage drop across the current flow control means of the voltage regulator and, hence, the energization of the bucking winding will be substantially in accordance with the regulating needs of the generator and will have a substantially negligible effect on the output of the generator when maximum output of the generator is needed or is desirable.

Although the electrical generating systems and regulating means of the present invention have been illustrated and described herein to a somewhat detailed extent, it will be understood, of course, that the invention is not to be regarded as being limited correspondingly in scope, but includes all changes and modifications coming within the terms of the claims hereof.

Having thus described my invention, I claim:

1. In an electrical system, a generator having terminals and a main field winding, a regulator having energizing coil means connected with the generator terminals and switch contacts responsive to said coil means, a field circuit having said main field winding therein and controlled by said switch contacts, resistance means in said field circuit in shunt relation to said switch contacts, and a bucking field winding connected in said field circuit so as to be energized in accordance with the voltage drop across said resistance means when said switch contacts are open.

2. In an electrical system, a generator having terminals and a main field winding, a regulator having energizing coil means connected with the generator terminals and switch contacts responsive to said coil means, a field circuit having said main field winding therein in series with and controlled by said switch contacts, resistance means in said field circuit in series with said main field winding and in shunt relation to said switch contacts, and a bucking field winding connected in said field circuit in series with said main field winding and in parallel with said resistance means so as to be energized in accordance with the voltage drop across said resistance means when said switch contacts are open.

3. In an electrical system, a generator having load terminals and a main field winding, a voltage regulator having a voltage magnet coil connected across said terminals and current flow control means responsive to variation in the energization of said voltage magnet coil, a current regulator having a series magnet coil connected in series circuit with said terminals and switch contacts responsive to variation in the energization of said series magnet coil, a field circuit having said main field winding therein and controlled by said current flow control means and by said switch contacts, a regulating resistance in said field circuit in shunt relation to said switch contacts, and a second field winding magnetically opposing said main field winding, said current flow control means comprising other switch contacts in said field circuit in series with said main field winding and a second resistance in said field circuit in series with said main field winding and in shunt relation to said other switch contacts, said second field winding being in said field circuit in series with said main field winding and in parallel with said second resistance such as to be energized in accordance with the voltage drop across said second resistance when said other switch contacts are open.

4. In an electrical system, a generator having load terminals and a main field winding, a voltage regulator having a voltage magnet coil connected across said terminals and first switch contacts responsive to variation in the energization of said voltage magnet coil, a current regulator having a series magnet coil connected in series circuit with said terminals and second switch contacts responsive to variation in the energization of said series magnet coil, a field circuit having said main field winding therein in series with and controlled by said first and second switch contacts, a first resistance in said field circuit in shunt relation to said first switch contacts, a second resistance in said field circuit in shunt relation to said second switch contacts, and a bucking field winding connected in said field circuit in series with said main field winding and in parallel with said first resistance so as to be energized in accordance with the voltage drop across said first resistance when said first switch contacts are open.

5. In an electrical system, a generator having load terminals and a main field winding, a voltage regulator having a voltage magnet coil connected across said terminals and switch contact means responsive to variation in the energization of said voltage magnet coil, a field circuit having said main field winding therein and controlled by said switch contact means, said switch contact means comprising a first pair of contacts in said field circuit in series with said main field winding and a second pair of contacts effective when closed to short-circuit said main field winding, a resistance in said field circuit in shunt relation to said first pair of contacts, and a second field winding magnetically opposing said main field winding and connected in said field circuit in series with said main field winding and in parallel with said resistance so as to be energized in accordance with the voltage drop across said resistance when said first pair of contacts are open.

6. In an electrical system, a direct current generator having load terminals and a main field winding, a voltage regulator of the relay type having a voltage magnet coil connected across said terminals and vibratory switch contacts responsive to variation in the energization of said voltage magnet coil, a field circuit having said main field winding therein in series with said switch contacts, a resistor in said field circuit in shunt relation to said switch contacts, and a second field winding magnetically opposing said main field winding and connected in said field circuit in series with said main field winding and in parallel with said resistor so as to be energized in accordance with the voltage drop across said resistor when said contacts are open.

No references cited.